United States Patent [19]

Burns et al.

[11] 4,316,811

[45] Feb. 23, 1982

[54] DUST SUPPRESSANT

[75] Inventors: Edward J. Burns; James R. Hatfield, both of Omaha, Nebr.

[73] Assignee: InterNorth, Inc, Omaha, Nebr.

[21] Appl. No.: 167,459

[22] Filed: Jul. 10, 1980

[51] Int. Cl.$^3$ ............... B28D 7/02; C09K 3/22; E21C 7/08; E21F 5/06

[52] U.S. Cl. ............................. 252/88; 98/50; 299/12; 427/220; 427/221

[58] Field of Search ............ 252/88, 91, 89.1; 299/12; 98/50; 427/220, 221

[56] References Cited

U.S. PATENT DOCUMENTS

| | | | |
|---|---|---|---|
| 2,329,694 | 9/1943 | Bodman | 252/368 |
| 2,480,579 | 8/1949 | Holuba | 252/539 |
| 2,489,955 | 11/1949 | Colgate | 252/88 |
| 2,597,201 | 5/1952 | Swiss | 252/88 |
| 2,620,044 | 12/1952 | Fine | 252/88 |
| 2,806,001 | 9/1957 | Fong | 252/550 |
| 3,324,038 | 6/1967 | Chaffee | 252/545 |
| 3,519,570 | 7/1970 | McCarty | 252/135 |
| 3,861,895 | 1/1975 | Tarazi | 65/3 |
| 3,936,561 | 2/1976 | Cotton | 428/264 |
| 3,944,663 | 3/1976 | Weiss | 252/173 |
| 4,108,800 | 8/1978 | Froehlich | 252/541 |
| 4,132,814 | 2/1979 | De Luca | 427/113 |
| 4,171,276 | 10/1979 | Brehm | 252/88 |

FOREIGN PATENT DOCUMENTS

979314  12/1975  Canada .................................. 252/88

OTHER PUBLICATIONS

*Chemical Abstracts:* 88:157548z, "Wettability of Coal Dust by Surfactant Solutions", by I. D. Kiseleva.

*Primary Examiner*—Dennis L. Albrecht
*Attorney, Agent, or Firm*—Donald F. Haas

[57] ABSTRACT

A dust suppressant composition is described which is comprised of at least about 0.001 percent of polyethylene oxide with a molecular weight of at least about 6500, with the balance being water. Also described is a method for suppressing the formation of dust particles by applying the aforementioned composition to a dust-producing material such that at least about 0.01 grams of polyethylene oxide is applied per 100 square inches of flat surface area of dust-producing material.

2 Claims, No Drawings

DUST SUPPRESSANT

BACKGROUND OF THE INVENTION

This invention relates to dust suppression and more particularly to the use of an aqueous solution of polyethylene oxide for the purpose of dust suppression.

Dust suppression connotes the prevention or reduction of the extent to which finely particulate solid matter becomes suspended in a gas, usually air. In this situation, the finely particulate solid matter can either already be in existence or being produced as a result of various mechanical operations such as grinding, milling, cutting, pounding, explosion, and the like. Common industrial sources of dust are open operations, leaks and spills, storage and disposal, and poor housekeeping. Transportation, handling, and storage are all areas wherein a great amount of coal dust is created.

Dust created in industrial situations is a major cause of air pollution. Everyone is aware that the dust which is created in coal mining operations is considered to be a major cause of pneumoconiosis, more commonly known as black lung disease. Since the dust is confined within a small air space in coal mining operations, dust explosions are a serious hazard. The present invention is intended to provide one method by which the foregoing undesirable results may be avoided.

In both industrial and coal mining applications, there already exist both mechanical and chemical methods for preventing dust or fine particulate matter from becoming airborne. Ventilation and/or the use of exhaust fans are used in both industrial and mining applications. Furthermore, water is commonly used to prevent dust particles from becoming airborne by keeping them wet and there are a number of aqueous solutions (of surfactants, etc.) which are also used for this purpose. U.S. Pat. Nos. 3,690,727, issued to Degginger on Sept. 12, 1972, and 4,136,050, issued to Brehm on Jan. 23, 1979 describe such aqueous solutions. Aqueous foam compositions have also been used to suppress dust. This method was initially studied in British coal mines and U.S. Pat. No. 3,954,662, issued to Salyer, Schwendeman, and Shih-ming Sun on May 4, 1976, describes one such aqueous foam composition.

As stated above, the present invention contemplates the use of an aqueous solution of polyethylene oxide to achieve the advantageous results described herein. U.S. Pat. Nos. 2,538,199 issued to Jefferson and Stigger on Jan. 16, 1951, and 2,620,044 issued to Fine and Trowbridge on Dec. 2, 1952, describe dust adhesives for gas filters. These compositions include, among other ingredients, polyethylene ethers of sorbitan mono tall oil ethers, alkyl phenols, glycerol, diethylene glycol, sorbitol, glucose, diglycerol, sucrose, and others as wetting agents. These compounds appear to be somewhat similar structurally to the polyethylene oxide of the present invention, but as ethers they are quite obviously chemically distinct therefrom. U.S. Pat. No. 4,136,050, issued to Brehm on Jan. 23, 1979, describes a method for increasing the wettability of dust particles by treating them with an aqueous solution of octylphenoxy polyethoxy ethanol and a copolymer of ethylene oxide and propylene oxide. This patent discloses only that the composition is useful in liquid form. The advantages of dust suppression are also achieved with the present invention after the water has evaporated. The polyethylene oxide acts as a dust suppressant after the composition has dried on the coal or other dust-producing material to which it has been applied.

SUMMARY OF THE INVENTION

The present invention relates to a dust suppressant composition comprising at least about 0.01 percent by weight of polyethylene oxide having a molecular weight of at least about 6500 and the balance water. The invention also relates to a method for suppressing dust formation comprising treating the surface of dust-producing material with the above composition such that at least about 0.001 grams of polyethylene oxide per 100 square inches of flat surface area of dust-producing material is applied to the dust-producing material. The dust-producing material may be coal, limestone, gypsum, rock, grain, ore, taconite, sulfur, phosphate, etc.

In a preferred embodiment, the concentration of polyethylene oxide is from about 0.01 percent to about 25 percent, the molecular weight of the polyethylene oxide is about 15,000 to 20,000, and at least about 4 grams per 100 square inches of flat surface area is applied to the dust-producing material. In another preferred embodiment, the concentration of the polyethylene oxide is from about 0.01 percent to about 20 percent, the molecular weight of the polyethylene oxide is about 100,000, and at least about 0.8 grams of polyethylene oxide per 100 square inches of flat surface area is applied to the dust-producing material. In another preferred embodiment, the concentration of the polyethylene oxide is from about 0.01 percent to about 8 percent, the molecular weight of the polyethylene oxide is about 300,000, and at least about 0.2 grams of polyethylene oxide per 100 square inches of flat surface area is applied to the dust producing material. In still another preferred embodiment, the concentration of the polyethylene oxide is from about 0.01 percent to about 5 percent, the molecular weight is about 900,000, and at least 0.1 grams per 100 square inches is applied to the dust producing material. In still another preferred embodiment, the concentration of the polyethylene oxide is from about 0.01 percent to about 2 percent, the molecular weight is about 4 million, and at least 0.001 grams per 100 square inches of flat surface area is applied.

DETAILED DESCRIPTION OF THE INVENTION

It has been found that the application of at least about 0.001 gram of polyethylene oxide per 100 square inches of flat surface area of dust-producing material from a solution of at least about 0.01 percent polyethylene oxide in water to a dust-producing material will suppress or decrease the amount of dust which that material produces. For coal, the application of the above composition will decrease the amount of coal dust up to at least 90 percent. In addition, it will increase the crushing strength of the coal by about 2 to 5 times depending upon the strength of the solution, thus decreasing the additional formation of dust.

Polyethylene oxide is a crystalline, thermoplastic, water-soluble polymer with the general formula $HOCH_2(CH_2OCH_2)_nCH_2OH$ or $H(OCH_2CH_2)_nOH$. The end groups are said to be hydroxyl groups only in the case of the lower molecular weight species. Unlike most polymer systems, polyethylene oxide is commercially available in an extraordinarily wide range of molecular weights from ethylene glycol, diethylene glycol, and so on, up to polymers that have molecular weights many times greater than a million. The lower molecular weight members of the series with n up to about 150 (molecular weight from about 200 to about 6000) are generally known as polyethylene glycols while the higher members (molecular weight greater than 6500 up to 100,000 to several million) are known as polyethylene oxide, polyoxyethylene, or polyoxirane. The preferred polyethylene oxide polymers for use in the present invention have a molecular weight of at least about 6500 and, theoretically, there is no maximum.

The higher (polyethylene oxide) and lower (polyethylene glycol) molecular weight members of this series differs sufficiently in properties as to form two classes. The lower members range from relatively viscous fluids to wax-like solids while the higher members are true thermoplastics capable of being formed into tough, molded shapes. The property differences of these two classes are due principally to large differences in molecular weight and the relatively greater importance, therefore, of the end n groups in the low molecular weight class. The polyethylene oxide polymers used in the present invention are made by conventional processes such as suspension of polymerization or condensation of ethylene oxide. The composition of the present invention is prepared by dissolving the proper amount of polyethylene oxide in a measured amount of water. This may be accomplished by any convenient method, but we have found that simply mixing the polyethylene oxide in warm water (30° C. to 70° C.) is sufficient to provide the desired composition.

We have found that if less than 0.01 percent of polyethylene oxide is used in the composition, then sufficient dust suppression will take place even though some suppression of dust will occur. The upper limit of polyethylene oxide concentration is a practical one and is limited only by the maximum amount of polyethylene oxide which can be dissolved in water without forming a gel. This depends upon the molecular weight. The highest concentration known to us that doesn't gellate is 83 percent, but in almost all cases, no more than 50 percent should be necessary. In general, the higher the concentration is, better dust suppression results.

We have determined that at least 0.001 grams per 100 square inches of flat surface area of dust-producing material of the polyethylene oxide must be applied to the dust-producing material in order to achieve the advantages of the present invention. If less than this amount is applied to the dust-producing material, then the result will be the same as if the concentration of the solution were less than 0.01 percent. Theoretically, there is no maximum amount of polyethylene oxide which can be applied to the dust-producing materials to achieve the advantages of the present invention. However, we have determined that, from a practical standpoint, it is not necessary to apply more than 10 grams of polyethylene oxide per 100 square inches of flat surface area of dust-producing material. The term "flat surface area" means the area of the geometric boundaries of the dust-producing material and not the actual surface area of the individual particles on the surface of the dust-producing material.

The composition and method of the present invention can be utilized with a variety of dust-producing materials, including coal, limestone, gypsum, rock, rain, ore, taconite, sulfur, phosphate, etc. It is especially useful for use in coal mines, coal storage areas, and coal traansportation vehicles to prevent or decrease the amount of coal dust.

The composition of the present invention may be applied to the dust-producing materials by a variety of methods, such as spraying, immersion, painting, slurrying, rinsing, etc., including all of the presently known methods for applying water to dust-producing materials for the purpose of dust suppression. For example, lumps of coal may be immersed in the composition or the solution may be sprayed directly onto the coal. The water in the solution provides a certain amount of dust suppression. The viscosity of the polyethylene oxide solution is great enough to prevent it from running off the coal or other dust-producing material, while the water from the solution is allowed to evaporate. The polyethylene oxide provides excellent dust suppressant action even after the water from the composition has dried on the material to which it has been applied. Most known methods of dust suppression do not provide this advantage since their dust suppression capabilities are directly dependent upon keeping the particulate material wet.

The use of water may cause a problem in cold weather. Ethylene glycol or alcohol can be added to prevent freezing.

The following examples are meant to illustrate the invention and not to limit it in any way.

EXAMPLE I

The polyethylene oxide ussed in this example and the following example was manufactured by Union Carbide and has a molecular weight of 1 million.

A lump of coal was cut into five pieces. Four of these pieces were immersed for a few minutes in aqueous solutions of polyethylene oxide of varying strengths and then allowed to dry in the open air. The dried samples were first rapped with a hammer on a bench top and then tested for crushing strength. Only the untreated sample showed any significant loss of small particulate coal material. Sample I showed a small amount of loss but Samples 2, 3 and 4 showed no loss.

| Sample No. | ML/H$_2$O | g. PEO | % PEO | Crushing Strength (lbs. Force) |
|---|---|---|---|---|
| Control | — | — | — | 80 |
| 1 | 100 | 0.5 | 0.5 | 150 |
| 2 | 100 | 1.0 | 1.0 | 400 |
| 3 | 100 | 2.0 | 2.0 | 250 |
| 4 | 100 | 4.0 | 4.0 | 500 |

Therefore, it is shown that the use of polyethylene oxide decreases the dust and increases the crushing strength of the coal.

EXAMPLE II

A sample of approximately 640 grams of coal was split using a riffler. A solution of 2 percent polyethylene oxide (the same as used in Example I) in water was applied to one portion and allowed to dry in the open air. Both samples were weighed and then separately shaken vigorously in a container having a mesh top with a side air entry for five minutes under a constant flow of air. The untreated sample lost 2.24 grams or 0.70 percent of its weight and the treated sample lost 0.54 grams or 0.17 percent of its weight. It can be seen that the use of polyethylene oxide decreased the loss of particulate matter.

EXAMPLE III

Three piles of Meeker G seam ¼ inch coal fines were sprayed with varying amounts of a 0.5 prcent polyethylene oxide solution. The polyethylene oxide was the same as used in Example I. These three piles of coal fines and one untreated pile were subjected to a wind source which was turned on at some distance from the piles and then moved closer to them. The points at which dust loss first occurred, was moderate, and was heavy were noted and the distance between the air source and the pile at those points was recorded along with the velocity of the wind at the pile. The following table shows the results of this experiment:

|  | Untreated | | 1.7 g/100in² | | .84 g/100in² | | .42 g/100in² | |
|---|---|---|---|---|---|---|---|---|
| (In) (Mph) | DIST (IN) | VEL (MPH) | DIST (IN) | VEL (MPH) | DIST (IN) | VEL (MPH) | DIST (IN) | VEL (MPH) |
| Light Dust | 53.5 | 10 | 27 | 25 | 36.5 | 16 | 35 | 18 |
| Mod. Dust | 45.5 | 12 | 21 | 40 | 29 | 22 | 21.5 | 38 |
| Heavy Dust | 39.0 | 14 | 13 | 55 | 21 | 40 | 16.5 | 50 |

It can be seen that the treated samples withstood the effects of the wind source much better than the untreated sample did and that the more highly concentrated solution provided better protection than the lesser concentrated solutions did.

EXAMPLE IV

A pile of Meeker G seam ¼ inch coal fines was sprayed with a 0.5 percent solution of the polyethylene oxide of Example I in water and exposed to natural weather conditions along with an untreated pile. During the test, the treated pile was exposed to 1½ inches of rain and winds gusting up to 50 mph. The treated coal pile showed no significant degradation until over 1.4 inches of rain fell at which time noticeable slacking had occurred. Meanwhile, the untreated pile had failed to resist the strong wind and rain.

EXAMPLE V

Several samples of a known amount of ¼ inch coal fines from G seam coal were placed in a container measuring 7 inches by 12 inches by 3¾ inches and sprayed with a known volume of polyethylene oxide solution. After drying for 20 hours, the coal and container were weighed and placed in a wind tunnel. The samples were then subjected to 50 mph wind and reweighed. The dust loss was calculated by subtracting the weight of the coal after exposure to the wind from the weight of the coal before exposure to the wind. The experiment was repeated for six different molecular weights of polyethylene oxide, several different solution concentrations for each polyethylene oxide, and several different application rates for each solution concentration. The application rate is the amount of polyethylene oxide applied to each 100 square inches of flat surface area of the coal fines. The dust loss is calculated by dividing the difference between the weights before and after wind treatment by the weight before wind treatment and multiplying by 100. The dedusting unit is calculating by using the formula:

$$\text{Dedusting} = \frac{\text{Loss Without Treatment} - \text{Loss With Treatment}}{\text{Loss Without Treatment}} \times 100.$$

The results are shown in the following table:

| Molecular Weight | Solution Concentration | Application Rate (g polymer 100in²) | Dust Loss (%) | Dedusting |
|---|---|---|---|---|
| 7000–9000 | 12½% | 0 | 7.11 | 0 |
| | | 7.5 | 4.8 | 32 |
| | | 12.5 | 2.6 | 63 |
| | | 25 | 2.4 | 66 |
| | 25% | 0 | 6.95 | 0 |
| | | 7.5 | 4.2 | 40 |
| | | 15.0 | 1.3 | 81 |
| | | 25.0 | 1.2 | 83 |
| | | 50. | 1.3 | 81 |
| | 50% | 0 | 6.95% | 0 |
| | | 5 | 5.35 | 23 |
| | | 10 | .82 | 88 |
| | | 20 | .61 | 91 |
| | | 50 | .31 | 96 |
| 20,000 | 5% | 0 | 7.42 | 0 |
| | | 1.0 | 9.09 | Negative |
| | | 2.0 | 7.92 | Negative |
| | | 2.5 | 2.22 | 70 |
| | | 3.0 | 2.64 | 66 |
| | 10% | 0 | 7.43 | 0 |
| | | 1.0 | 9.33 | Negative |
| | | 2.0 | 8.27 | Negative |
| | | 4.0 | 1.73 | 77 |
| | | 6.0 | .76 | 90 |
| | | 12.0 | 1.07 | 86 |
| | 20% | 0 | 7.40 | 0 |
| | | 1.0 | 9.21 | Negative |
| | | 2.0 | 7.70 | Negative |
| | | 4.0 | 1.23 | 83 |
| | | 6.0 | .89 | 88 |
| | | 8.0 | .90 | 88 |
| 100,000 | 1% | 0 | 8.5 | 0 |
| | | .1 | 8.4 | 1 |
| | | .3 | 5.8 | 32 |
| | | .6 | 4.7 | 45 |
| | | 1.2 | 3.5 | 59 |
| | | 1.8 | 4.0 | 53 |
| | 2% | 0 | 7.10 | 0 |
| | | .4 | 3.36 | 53 |
| | | .6 | 3.05 | 57 |
| | | .8 | 2.67 | 62 |
| | | 1.2 | 2.56 | 64 |
| | | 1.4 | 2.88 | 59 |
| | 3% | 0 | 7.02 | 0 |
| | | .9 | 3.56 | 49 |
| | | 1.5 | 2.11 | 70 |
| | | 2.7 | 1.78 | 89 |
| | | 3.0 | 1.98 | 72 |
| | 4% | 0 | 6.97 | 0 |
| | | .68 | 3.78 | 46 |
| | | 1.4 | 2.85 | 59 |
| | | 2.1 | 1.58 | 77 |
| | | 2.8 | 1.66 | 76 |
| | | 4.2 | 2.66 | 62 |
| | 6% | 0 | 7.8 | 0 |
| | | .6 | 1.5 | 81 |
| | | 1.2 | .45 | 94 |
| | | 1.8 | .25 | 97 |
| | | 2.4 | .8 | 90 |
| 300,000 | 1% | 0 | 7.6 | 0 |
| | | .1 | 6.2 | 18 |

-continued

| Molecular Weight | Solution Concentration | Application Rate (g polymer 100in²) | Dust Loss (%) | Dedusting |
|---|---|---|---|---|
| | | .2 | 1.2 | 84 |
| | | .3 | .9 | 88 |
| | | .5 | .8 | 89 |
| | | 1.0 | 1.0 | 87 |
| | 2% | 0 | 7.8 | 0 |
| | | .2 | .8 | 90 |
| | | .4 | .5 | 94 |
| | | .6 | .6 | 93 |
| | | .8 | .4 | 95 |
| | | 1.0 | .5 | 94 |
| | 5% | 0 | 7.6 | 0 |
| | | .2 | 1.9 | 75 |
| | | .4 | 1.4 | 82 |
| | | .8 | 1.3 | 83 |
| 900,000 | .25% | 0 | 7.9 | 0 |
| | | .05 | 3.2 | 60 |
| | | .1 | 2.1 | 73 |
| | | .2 | 2.0 | 75 |
| | | .4 | 2.2 | 72 |
| | 1% | 0 | 8.1 | 0 |
| | | .1 | .3 | 96 |
| | | .2 | .5 | 94 |
| | | .4 | .3 | 96 |
| | | .8 | .4 | 95 |
| | 5% | 0 | 7.9 | 0 |
| | | .05 | 1.9 | 76 |
| | | .1 | 1.1 | 86 |
| | | .2 | 1.0 | 87 |
| | | .4 | .9 | 88 |
| | | .8 | 1.2 | 85 |
| 4 million | .01 | 0 | 7.7 | 0 |
| | | .001 | 2.6 | 66 |
| | | .005 | 1.2 | 84 |
| | | .01 | .8 | 90 |
| | | .025 | .9 | 88 |
| | .25 | 0 | 7.5 | 0 |
| | | .025 | .6 | 92 |
| | | .05 | .3 | 96 |
| | | .1 | .6 | 92 |
| | .5 | 0 | 7.5 | 0 |
| | | .05 | .3 | 96 |
| | | .1 | .4 | 95 |
| | | .2 | .3 | 96 |

We claim:

1. A method for suppressing dust formation in coal and for increasing the crushing strength of coal comprising contacting the surface of the coal with an aqueous composition comprising from about 0.01 percent to about 5 percent of polyethylene oxide having a molecular weight of at least about 900,000 and at least about 0.1 grams of polyethylene oxide per 100 square inches of flat surface area of coal is applied to the coal.

2. A method for suppressing dust formation in coal and for increasing the crushing strength of coal comprising contacting the surface of the coal with an aqueous composition comprising from about 0.01 percent to about 2 percent of polyethylene oxide having a molecular weight of at least about 4 million and at least about 0.001 grams of polyethylene oxide per 100 square inches of flat surface area of coal is applied to the coal.

* * * * *